United States Patent [19]

Andrasfalvy

[11] 3,944,404

[45] Mar. 16, 1976

[54] POWDER RECLAMATION DEVICE FOR ELECTROSTATIC POWDER COATING SYSTEMS

[76] Inventor: Kálmán Andrásfalvy, Hauptstr. 139 - 141, 7553 Muggensturm, Germany

[22] Filed: Dec. 19, 1973

[21] Appl. No.: 426,404

[30] Foreign Application Priority Data

Dec. 19, 1972 Germany ............................ 2262084

[52] U.S. Cl. ....................... 55/294; 55/302; 55/360; 55/418; 55/429; 209/10; 55/341 MC

[51] Int. Cl.$^2$ ............................................ B01D 50/00

[58] Field of Search ......... 55/96, 97, 273, 283, 284, 55/286, 287, 288, 291, 293, 294, 302, 341, 418, 429, 360; 209/10

[56] References Cited

UNITED STATES PATENTS

| | | | |
|---|---|---|---|
| 1,784,339 | 12/1930 | Clasen et al. | 55/302 |
| 2,507,335 | 5/1950 | Donohue | 55/287 |
| 2,695,681 | 11/1954 | Boesger | 55/287 |
| 3,473,300 | 10/1969 | Wilm et al. | 55/96 |
| 3,535,851 | 10/1970 | Riemsloh | 55/337 |
| 3,577,705 | 5/1971 | Sharlit | 55/283 |
| 3,699,747 | 10/1972 | Kroll | 55/96 |
| 3,780,502 | 12/1973 | Dupre et al. | 55/341 |

*Primary Examiner*—Bernard Nozick

[57] ABSTRACT

Device for the powder reclamation, specifically in electrostatic powder coating systems comprising a dust filter with a partition installed in an enclosure in a fashion such that a suction chamber for the air-powder mixture, which can be connected with the exhaust of the system, is created with a channel which passes the filter and has a constricted cross section while emptying into a funnel-shaped bottom part of the enclosure which may be detachable and can be sealed on the underside via a flange, above which channel there are arranged filter medium layers with upward extending passage openings which connect to an exhaust chamber with an air suction pump, in which chamber a compressed-air nozzle assembly is provided which can be moved across the filter medium layers for their blowout and cleaning.

5 Claims, 4 Drawing Figures

POWDER RECLAMATION DEVICE FOR ELECTROSTATIC POWDER COATING SYSTEMS

This invention relates to a device for powder reclamation, specifically in electrostatic powder coating systems.

In electrostatic powder coating systems, a powder is atomized by means of compressed air with an electrostatic spray device. The powder particles receive an electrostatic charge while passing through a spray element and are deposited on the grounded article. Once the powder has reached a certain thickness on the article, it acts as an insulation, and prevents further powder deposition. The powder drops in a spary booth and is sucked, together with the powder that missed the article, into a powder reclamation device. The coated articles are then fed to a baking furnace where the powder is melted to a coherent film and subsequently set.

Prior powder reclamation systems consist generally of so-called cyclone separators and fabric filter systems which are difficult to clean or cannot be cleaned at all. Consequently, a multicolor operation involves long downtimes and/or considerable investments. Moreover, the energy expense for the operation of the cyclones is extremely high, which also adds considerably to the expense of the powder reclamation.

The present invention provides a device for the powder reclamation, specifically in electrostatic powder coating systems, which does not have the drawbacks of known powder separators. In conjunction with a color change, the device permits a quick exchange and quick cleaning of its essential parts, while energy consumption for the reclamation of the powder is considerably lower than with cyclone separators.

As a solution of the defined problem, a powder reclamation device is provided, specifically for electrostatic powder coating systems, wherein an airborne particle filter with a partition is arranged in an enclosure so that a suction chamber for the air/powder mixture is created with a channel that passes the filter and has a constricted cross section. The channel empties into a funnel-type bottom part of the enclosure which may be detachable and can be sealed at the bottom side, by way of a flange. Above the channel or the enclosure part, filter medium layers are arranged with their passage openings oriented upward, and leading to an exhaust chamber with an air suction pump. In the exhaust chamber, a compressed-air nozzle arrangement is provided which can be moved across the filter medium layers, and serves to blow out and clean the latter.

According to a preferred, exemplary embodiment, the inventive device may be provided at the bottom end of the cross-sectionally constricted channel with a vane or baffle which constricts the cross section still further. In the upper part of the channel, the device may be provided with a sealing lid. In order to cyclically exhaust and clean the filter medium without interruptng the filter process proper, the suction chamber and the channel that passes the filter are subdivided into preferably three compartments. Each of the three channel compartments is provided with an independently adjustable sealing lid.

The enclosure with the lower funnel type part can be arranged detachably on the upper part, along with the suction and exhaust chambers, and coated inside with a plastic film. Lastly, a screen device may be provided in the lower, funnel-type part of the enclosure, so that it is possible to prepare the powder already in the enclosure.

The device according to the invention offers various advantages. Owing to the particular design of the filter enclosure and the possibility of removing the lower part, the enclosure permits easy access to all locations where the powder may accumulate. Also, the replacement of the compact filter can be performed quickly and without difficulty, and exchange filters are relatively inexpensive.

It is easy to clean the filter with the aid of the compressed air arrangement and independent of the degree of contamination. The compressed air is passed from above, through the openings of the filter. The baffle plate is suitably welded to the bottom part of the enclosure in order to cut down the cleaning work in conjunction with a color change, so that as much as 80% of the powder is removed in a preliminary operation, thereby relieving the filter. The particular design of the device enables a simple installation of a screening device, for instance, a sifting machine, in the lower part of the enclosure. This makes it possible to feed the screened-out powder from the bottom part, by way of an injector or similar devices, directly to the gun.

Metal strips, imbedded in the filter medium and connected to conductive material or grounded, electrically discharges the separated powder already in the filter. With the aid of additional air, the filter can be blown out from above. The use of a special filter material guarantees a long service life, and a practically 100% separation is obtained at a small pressure loss. This makes the device very economical. Finally, the device may also be designed in modular fashion to permit a considerable expansion of a system with regard to specific throughput quantities of the air/powder mixture.

Other objects and features of the present invention will become apparent from the following detailed description taken in connection with the accompanying drawings which disclose a preferred embodiment of the invention. It is to be understood, however, that the drawings are designed for the purpose of illustration only and not for limiting the invention.

In the drawings wherein similar reference characters denote similar elements throughout the several views.

Figure 1:
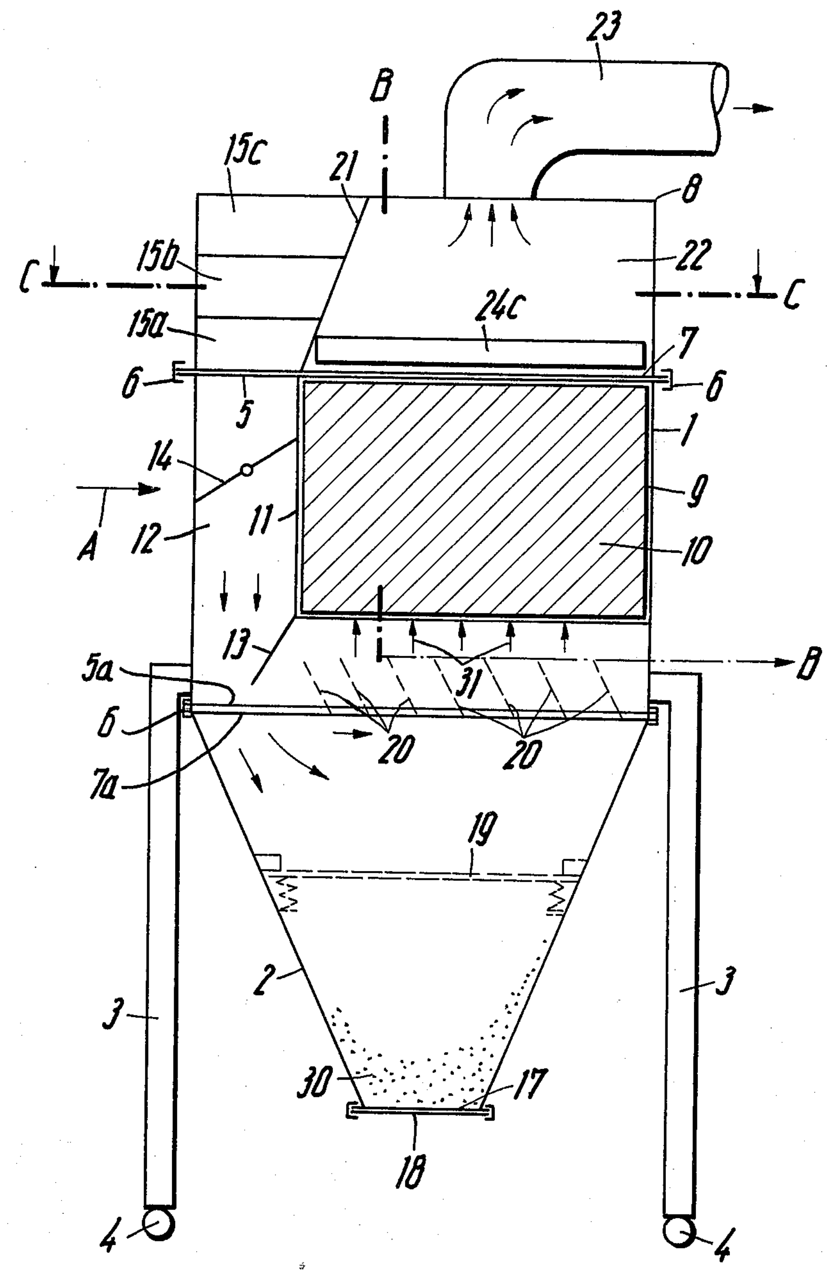
FIG. 1 is a schematic elevation of the inventive device, partly in cross section.

Referring to the drawings, the exemplary embodiment of the invention consists of a metal enclosure 1 which extends at the bottom side into a funnel-shaped part 2 while supported by a frame 3, which may run on casters 4. At the top and bottom, enclosure 1 is provided with flanges 5 and 5*a* which can be connected by means of a detachable clamping device 6 with an upper flange 7 of an upper enclosure part 8, and with a lower flange 7*a* of the funnel shaped part 3, respectively. The clamping devices may be fashioned in any manner. It is possible also to clamp and release pneumatically.

Enclosure 1 contains in its center part a filter element 9 with a dust filter 10 consisting of one or several layers of a filter medium.

Figure 2:
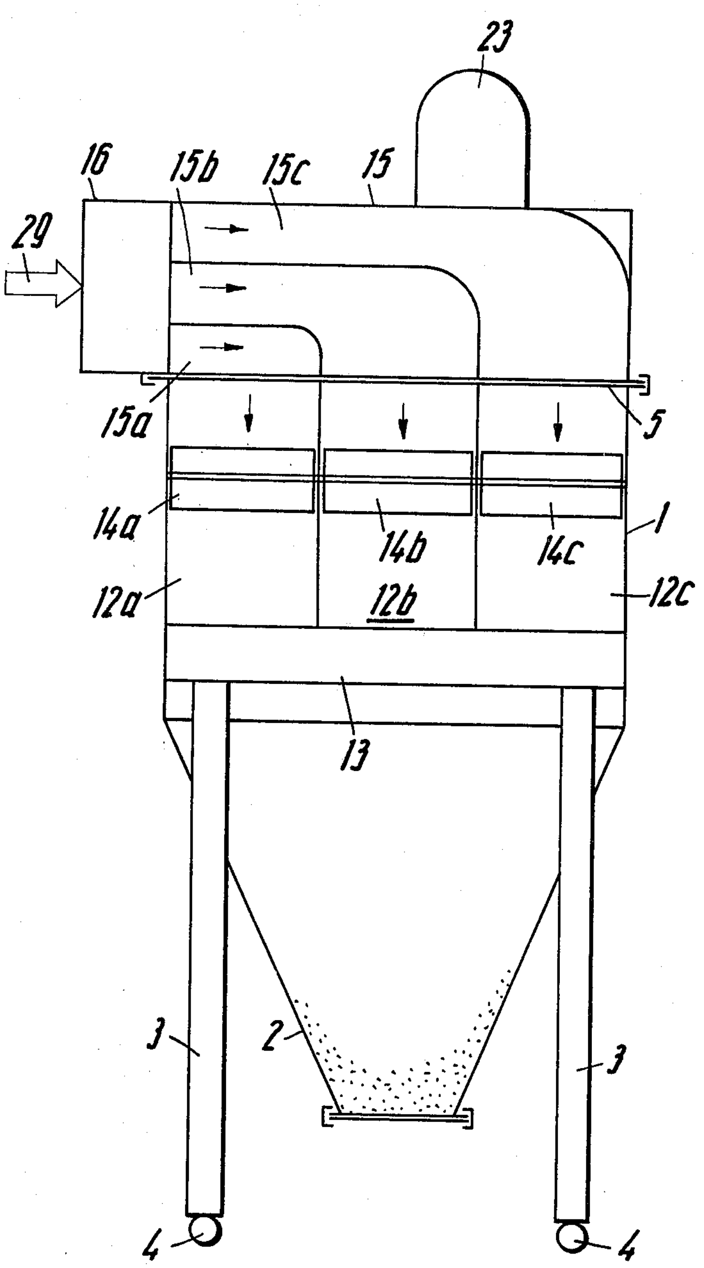
FIG. 2 is a partly schematic side view in direction of arrow A, according to FIG. 1, partly in sketch form.
Figure 3:
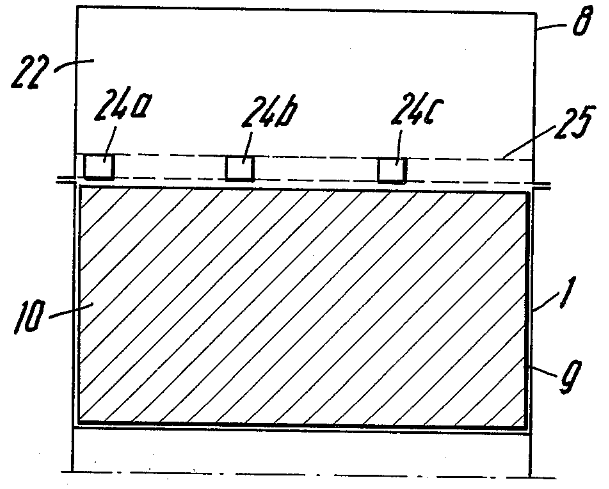
FIG. 3 is a view taken along section line B—B of FIG. 1.
Figure 4:
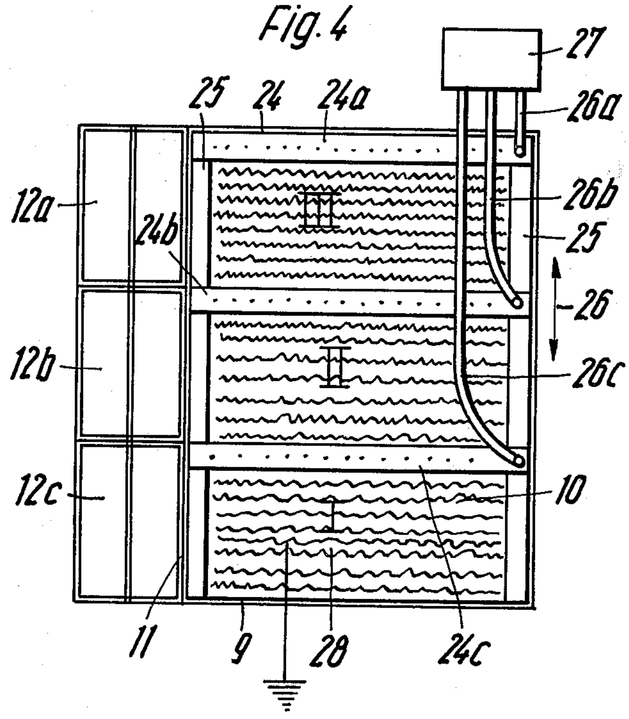
FIG. 4 is a plan view taken along section line C—C of FIG. 1.

Filter element 9 is somewhat narrower than enclosure 1, so as to create a channel 12 beside element 9, which is separated by a wall 11. As follows specifically from FIGS. 2 and 4, the channel is subdivided in three partitioned chambers 12*a*, 12*b*, and 12*c*. The channel 12 has at its lower end a cross section which is constricted by a baffle plate 13, which extends through each of the three chambers, and empties into the interior of funnel-shaped space 2.

In chambers 12*a*, 12*b* and 12*c* of channel 12 are sealing and opening dampers 14*a*, 14*b* and 14*c* which are adjustable independent from one another by pneumatic means (not shown) so that the chambers can be closed and opened in any desired sequence.

Chambers 12*a*, 12*b*, and 12*c* connect with a suction chamber 15 which is also subdivided into three compartments 15*a*, 15*b*, and 15*c* which run to the individual chambers 12*a*–12*c*. Suction chamber 15 connects via a socket or connector 16 with a feed line that runs to a work station.

The funnel-shaped lower part 2 of enclosure 1 collects the separated powder and can be sealed on its underside by a cover 18, which bears on a flange 17. If desired, connections may also be provided on funnel-shaped bottom part 2, for a pneumatic return of the powder, or for a direct connection with a powder carriage of the electrostatic powder coating device.

Inside funnel-shaped part 2, a sifting device 19, schematically illustrated by dashed lines, can be provided in which a powder classification can be carried out according to the screen employed.

If necessary, additional inclined baffle plates 20, illustrated by dashed lines, can be provided above a screen assembly 19 in a suitable frame. It has been found, however, that in ordinary applications, there is no need for a baffle arrangement of this type.

Located in the upper part 8 of the enclosure, separated by a partition 21 from the suction chamber 15, is an exhaust chamber 22 running to an exhaust or separating pipe 23. Instead of the direct pipe connection 23, a powdered blower may be connected to the exhaust chamber 22 as a suction device.

Contained in exhaust chamber 22 is a nozzle arrangement (24) consisting of three oblong, hollow, transversely extending chambers 24*a*, 24*b*, and 24*c*. These are arranged in a frame 25 in an axially movable fashion so that, when moved axially in the direction of double arrow 26, they will sweep across three partial compartments I, II, and III of the filter medium layers 10 underneath. Amounting each to one-third of the filter length, these partial areas I, II, and III correspond by width with the chambers 12*a*, 12*b*, and 12*c* of channel 12.

The oblong hollow chambers 24*a*, 24*b*, and 24*c* are equipped with nozzle-type openings which are directed at the filter medium. The chamber themselves connect by way of appropriate movable feed lines 26*a*, 26*b*, and 26*c* with a regulable compressed-air system 27 which is illustrated schematically. Feed lines 26*a*, 26*b*, and 26*c* allow compressed air to enter chambers 24*a*, 24*b*, and 24*c* in any desired sequence and grouping, and independent from one another.

Imbedded in the filter medium, between the ribs, are metal strips 28 which connect to conductive material, or are grounded. There is, thus, an electrical discharge of the separated powder already in the filter, which in turn blows the powder out, from above, with the aid of the compressed air issuing out of the openings of oblong chambers 24*a*, 24*b*, and 24*c*.

In the operation of the inventive device, powder-laden air is sucked in from the point of work by way of the socket 16, in the direction of the arrow 29 shown in solid lines. Three suction chambers 15*a*, 15*b*, and 15*c* subdivide the powder flow in three parts which are passed to the individual chambers 12*a*, 12*b*, and 12*c*. When closures 14*a*, 14*b*, and 14*c* are open, the powder flow proceeds through these chambers and into the area of the flow cross section which is constricted by baffle plate 13.

There, the velocity of the powder flow is the greatest, while after passing the constriction, the powder flow enters the space formed by funnel-shaped part 2, slows down suddenly, and expands, so that the greatest part of the powder precipitates in funnel-shaped part 2, as indicated at section 30. When the screen assembly 19 is provided in funnel-shaped part 2, it can be moved back and forth so that at the bottom of the funnel-shaped part 2, a powder of the desired grain size will be obtained.

This first measure causes the greatest part of the powder to separate from the flow, while the remaining air flow with the residual powder particles is sucked from below through filter medium 10 in the direction of arrows 31. The proper selection of the filter medium will make sure that all of the powder particles will be separated completely in the filter, so that the purified air in exhaust or separating chamber 22 can be exhausted via an appropriate blower 23 and or the exhaust pipe 23.

In order to subject the filter to a continuous cleaning process, it is blown out section by section, in a downward direction, with the aid of the compressed-air nozzle arrangement. The procedure may be arranged so that when an excessive pressure differential exists between exhaust chamber 22 and the upper space in funnel-shaped part 2 of enclosure 1, chamber 12*a* is, for example, first sealed with the respective closure 14*a*.

Next, the air nozzle arrangement 24 supported by a frame is shifted across the upper part of the filter element in the direction of arrow 26, so that compressed air enters into oblong chamber 24*a* via flexible feed line 26*a*. As a result, the upper third III of the filter element is blown out in downward direction during the movement of chamber 24*a*, which corresponds to the cleaning of this part of the filter, while the two areas I and II remain in operation since no compressed air entered chambers 24*b* and 24*c*, and dampers 14*b* and 14*c* are open.

Once section or area III of the filter has been cleaned in this fashion, and nozzle arrangement 24 has returned to its starting position, damper 14*a* is opened so as to permit powder-laden air to again proceed through chamber 12*a* of channel 12. Damper 14*b* is now closed, and the nozzle arrangement moved in the same fashion along arrow 26, so that compressed air now enters chamber 24*a* via flexible feed line 26*b*. Section II of the filter is cleaned in this manner while the two remaining sections I and II remain in operation, since dampers 14*a* and 14*c* are open.

Following the cleaning of section II, lastly, section I is cleaned in the same fashion by closing damper 12*c* so that compressed air enters into chamber 24*c* via feed line 26*c* and by moving the nozzle assembly in the direction of arrow 26. Thus, the filter can be cleaned as illustrated, without interrupting the filtering operation.

Also, the installed dampers may prevent any dust explosion from spreading and, as the case may be, possibly destroying the entire system. In case of a dust explosion or powder fire, the dampers serve as check dampers, wherein an appropriate contactor in the powder spray booth emits a signal necessary to close all dampers 14*a*, 14*b* and 14*c*.

Powder 30, which has accumulated in funnel-shaped part 2, can be withdrawn by opening closure 18. It is also possible, however, to provide on the funnel-shaped bottom section of the enclosure, in the lower area, connections for a pneumatic return of the powder, or for a direct connection with the powder carriage of the electrostatic powder coating device.

While only an exemplary embodiment of the present invention has been shown and described, it will be obvious that many changes and modifications may be made thereunto without departing from the spirit and scope of the invention.

What is claimed is:

1. A device for reclaiming powders, particularly for electrostatic powder coating systems, comprising, in combination:

a hollow housing having a top and bottom portion;

a filter means mounted in said housing between said top and bottom portion for filtering air passing therethrough and having filter layers defining vertically extending passage openings, said filter layers being wave-like and aligned in a first direction parallel to each other;

partition walls mounted in said housing adjacent to said filter means, for defining suction intake chamber means communicative with an inlet connection on said housing top portion for introducing the powder-laden air to be processed, as well as defining three channels adjacent to said filter compartments, and channel means passing alongside said suction chamber means;

said filter means and said filter layers defining three respective filter sections, each aligned with an adjacent one of said channels;

said suction intake chamber means including three adjacent, downwardly opening compartments, each communicative with a respective one of said three channels, the latter being adjacent, and directed downwardly in said channel means and for dividing the processed air;

said housing bottom portion being funnel-shaped and comunicating with said filter means and said channels, and including an outlet opening for the powder recovered from the processed air; said partition walls including a baffle plate transversely disposed at a bottom portion of said partition walls to constrict the cross-section of said channels, respectively, just above said housing bottom portion;

an exhaust chamber communicating with said housing top portion and communicating downstream with said filter means;

damper means for controlling the flow of air to said suction intake chamber means, including individually adjustable dampers disposed in each of said channels;

compressed-air nozzle means mounted in said housing adjacent to said filter means at the top thereof and including three oblong chambers extending across the tops of the three filter sections, respectively, parallel to said filter layers, and nozzle-type openings linearly aligned in a bottom portion of said oblong chambers, downwardly directed at said filter layers, said obbng chambers being transversely movably mounted across the tops of said filter layers relative to said parallel orientation of said filter layers and further comprising means for selectively applying compressed air to, and connected to, said three oblong chambers, respectively, independently of each other, and wherein said oblong chambers sweep across each of said three filter sections; and means for simultaneously continuously operating said exhaust chamber to reclaim the powder from the processed air passing through at least one of said channels.

2. The device as defined in claim 1, further comprising means for detachably connecting said housing to said bottom portion, to said exhaust chamber, and to said suction chamber means.

3. The device as defined in claim 1, wherein said housing bottom portion includes a sifting device.

4. The device as defined in claim 1, wherein said filter means includes metal strips imbedded in said filter layers and electrically grounded to remove electrostatic charge.

5. The device as defined in claim 1, wherein said housing bottom portion includes further baffle plates between an inlet to said bottom portion and said filter means.

* * * * *